3,071,555
PROCESS FOR PREPARING AQUEOUS DISPERSION OR SOLVENT SOLUTION OF OLEFIN POLYMER FROM POLYMERIZATION SLURRY
Edward Allen Hunter, Baton Rouge, La., Marnell Albin Segura, Elizabeth, N.J., and Augustus Bailey Small, Baton Rouge, La., assignors to Esso Research and Engineering Company, a corporation of Delaware
Filed May 17, 1957, Ser. No. 659,973
11 Claims. (Cl. 260—29.7)

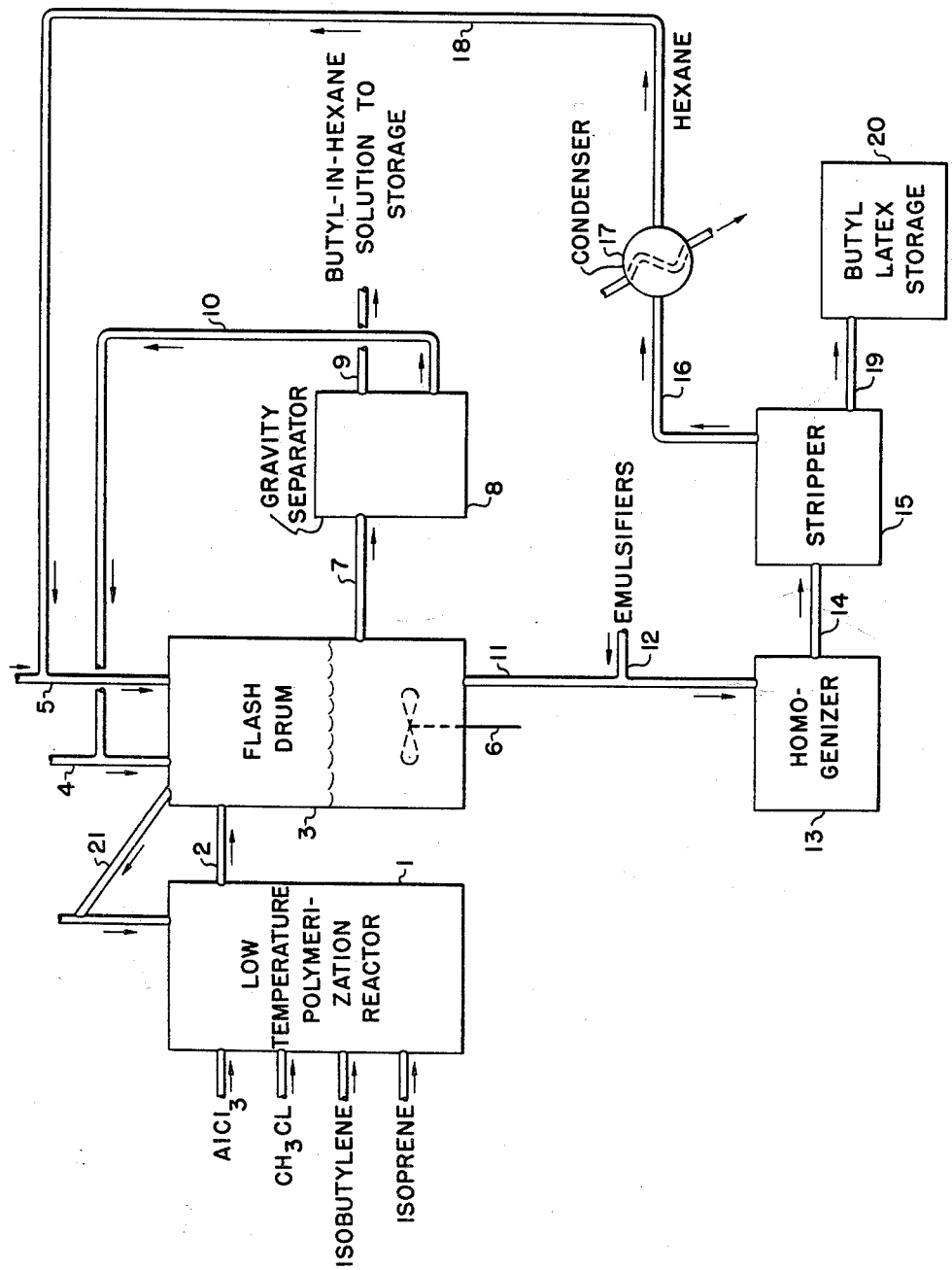
Edward A. Hunter
Marnell A. Segura      Inventors
Augustus B. Small
By  *[signature]*      Attorney United States Patent Office 3,071,555
Patented Jan. 1, 1963

This invention relates to polymerization processes and particularly to processes for the low temperature polymerization of iso-olefins or mixtures of iso-olefins and di-olefins. In a more specific aspect, the invention relates to the recovery of iso-olefin polymers produced at low temperatures.

It has been known for some time that high molecular weight polymers, i.e., those having a molecular weight of from about 15,000 to 25,000 up to 300,000 or more (as determined by the Staudinger method), are obtained if iso-olefins, such as isobutylene, are contacted with Friedel-Crafts type catalyst, such as aluminum chloride and the like, at temperatures below about —10° F. as described in U.S. patent to Mueller-Cunradi No. 2,203,-873 issued June 11, 1940. A polymer which is curable with sulfur can be obtained by reacting a mixture of about 70 to 99.5 wt. percent of an iso-olefin such as isobutylene with about 30 to 0.5 wt. percent of a conjugated diolefin such as butadiene or isoprene in the presence of a Friedel-Crafts catalyst, such as aluminum chloride, in a non-complex forming, low-freezing solvent such as a $C_1$ to $C_4$ alkyl halide, e.g., methyl or ethyl chloride, at temperatures between —10° F. and —250° F., preferably between —20° F. and —150° F. as described in Australian Patent No. 112,875 issued July 31, 1941, the subject matter of which is incorporated herein by reference. Copolymers of iso-olefins with aromatic hydrocarbons having unsaturated side chains, such as styrene, may be formed in the same manner at these low temperatures.

These polymerizations are conducted in the presence of an internal refrigerant, such as liquefied ethylene, in which case the heat of reaction is removed directly by evaporating part of the ethylene without the necessity of transferring heat through the surfaces of the reaction vessels. However, the refrigeration may be obtained by the use of cooling coils arranged in the reaction vessels, or by the use of large quantites of the alkyl halide diluent which has been cooled by external means. Regardless of the manner of refrigeration, the reaction is carried out so as to keep the solid polymer particles in a finely divided condition and suspended in the cold reaction mixture with the result that a slurry of solid polymer in the cold reaction mixture is obtained which can be handled at low temperature. This slurry is conventionally discharged into a well-agitated body of a heated liquid medium in which the polymer is insoluble, e.g. water. The water preferably contains a slurry dispersing agent, such as zinc stearate, and is maintained at a temperature well above the boiling point of the volatile materials accompanying the polymer in order to flash off the volatile liquids and form a slurry of polymer particles in the warm liquid. The slurry is then stripped of any residual volatile materials and dried while being conveyed through a tunnel on a screen or on sections of a perforated plate in the presence of warm air. The polymer thus obtained is in the form of small pieces, two or three centimeters long, usually called "crumb." If the final polymer product is desired in the form of a solution in hydrocarbons or as a latex in water, it has been necessary to dissolve the crumb in the hydrocarbon solvent at this point. Unfortunately, however, it is impossible to prepare solutions or latices of very high molecular weight polymer by this method since any method of drying which removes all the water from the polymer causes the polymer to break down in molecular weight. If a small amount of water is allowed to remain in the crumb, the problem of viscosity which is always present becomes acute, because the presence of this small amount of water forms a water-in-oil type of emulsion which increases the viscosity of the resulting solution to an undesirable and almost unmanageable degree.

In order to overcome the problem of molecular weight degradation, it has been proposed in Serial No. 625,640 filed December 3, 1956, in the name of Bruce R. Tegge, to replace the warm water or other liquid in which the polymer slurry from the polymerization reaction is discharged and in which it is insoluble with a liquid, such as a hydrocarbon, in which the polymer is soluble. However, the viscosity problem is still present and is often very acute since it is desirable to add small amounts of water, up to 500 p.p.m., in order to deactivate the catalyst.

In accordance with the present invention it has been found that the above disadvantages of highly viscous solutions and attendant handling difficulties and the problems of molecular weight breakdown can be overcome by discharging the slurry of polymer particles formed in the reaction zone into an unstable emulsion of hydrocarbon in water. Enough water must be present so that the emulsion is of the oil-in-water type. No emulsifying agent need be used. It is only necessary that the hydrocarbon be dispersed in the water while the polymer slurry is being added. This can be accomplished simply by the use of violent agitation which should be continued until the polymer is dissolved. The hydrocarbon and water must be at a temperature sufficiently high to volatilize all of the reaction fluids. If desired, the agitation may be supplemented by the use of steam which simultaneously acts as stripping agent to remove residual volatile materials and to maintain the hydrocarbon and water above the temperature necessary to volatilize the reactor fluids. The polymer particles go into solution in the hydrocarbon phase without excessive increase is viscosity, forming a solution of polymer in the hydrocarbon which in turn is dispersed in the water as the continuous phase.

If emulsifying agents are used in preparing the hydrocarbon-water emulsion, they may be any type of agent adapted for preparing an oil-in-water emulsion. They may be desirably selected in accordance with the end use of the polymer solution. If the emulsion is to be broken to recover the non-aqueous phase, then emulsifiers forming quick-breaking emulsions, such as soap solutions, may be used. However, if a stable polymer-water latex is desired then the emulsifiers should be those suitable for forming stable polymer latices, such as, for example, the anionic, cationic and non-ionic emulsifiers and emulsifier combinations disclosed in copending application of Charlet and Small, Serial No. 521,782 filed July 15, 1955, and incorporated herein by reference. The amount of emulsifier to be used may vary but a desirable amount is enough to leave less than 5.0 wt. percent, based on polymer, in the final solution or latex.

If the polymer-solvent-water system is to be converted to a polymer-water latex it is desirably passed through a suitable homogenizer such as a colloid mill, a dispersator, a Waring Blendor, a sonic mixer or the like with or without the use of additional emulsifying agents. If desired the emulsifying agents may be added only in the homogenizer. The homogenized emulsion is then stripped to remove the hydrocarbon solvent, leaving the finished latex which is passed to storage.

Broadly, the present invention consists of the steps of preparing a reactive mixture of the desired olefinic material at the desired low temperature, as taught in the Thomas and Sparks Patent 2,356,127 and Sparks Patent 2,356,128, both of which are incorporated herein by reference. Generally it is desirable to use isoolefins having not more than about 7 carbon atoms, the reaction material being preferably isobutylene, either with or without a diolefin such as butadiene, or isoprene, or 2,3-dimethyl-butadiene-1,3; or with piperylene or a non-conjugated diolefin such as 2-methyl hexadiene-1,5; 2,6-dimethyl hexadiene-1,5; or triolefins such as hexatriene, myrcene, 1,6-dimethyl heptartiene-1,3,5 and 2,4,6-trimethyl-1,3,5-hexatriene or other olefins having a plurality of double bonds; and up to 12 carbon atoms, and cooling the mixture by internal or external refrigeration, e.g. by liquid ethylene, to a temperature ranging from −40° C. to −100° C. or as low as −160° C. To this mixture there is then added a Friedel-Crafts type active halid catalyst, which may be aluminum chloride in solution in an inert low-freezing solvent or may be other similar active halide catalyst materials. This polymerization is conducted under conditions to give a finely pulverulent form of polymer or interpolymer particles.

In accordance with the present invention when the polymerization reaction has reached the desired stage of completion, it is passed to a flask tank containing a well-agitated mixture of water and water-immiscible polymer solvent heated to a temperature sufficient to volatilize all of the unreacted monomers and alkyl halide diluent from the polymer slurry. The solvent phase dissolves the polymer while the water phase deactivates and washes out the deactivated catalyst from the polymer.

Certain preferred details of construction and advantages will be apparent and the invention itself will be best understood by reference to the following description and accompanying drawing wherein the single FIGURE is a diagrammatic view of an apparatus suitable for carrying out the invention.

Referring to the drawing, the polymerization equipment consists of a tube bundle type of reactor 1 which is suitably arranged in accordance with the disclosure in U.S. Patent No. 2,523,289, reference to which may be had for further details and which is incorporated herein by reference. The polymerization mixture may consist of from 60 to 99.5 wt. percent of iso-olefin having from 4 to 8 carbon atoms per molecule, isobutylene being the preferred material. The diolefin may be butadiene or may be substantially any of the substituted butadienes up to those having from 10 to 12 carbon atoms per molecule in the proportion of 40 to 0.5 wt. percent. Isoprene is the preferred diolefin. Alternatively, the non-conjugated diolefins, such as dimethylallene, or the triolefins, such as myrcene, having up to 10 or 12 carbon atoms per molecule, may also be used. For simplicity the monomers will hereinafter be referred to as isobutylene and isoprene. The polymerization mixture contains in addition from 100 parts to 700 parts or more of alkyl halide, such as methyl chloride, ethyl chloride or the like, which will be referred to hereinafter as methyl chloride.

The catalyst conveniently consists of a Friedel-Crafts type catalyst, such as aluminum chloride, titanium tetrachloride, zirconium chloride, uranium chloride, boron fluoride and the like. For simplicity the catalyst will be referred to hereinafter as aluminum chloride which is the preferred species. The aluminum chloride is preferably dissolved in a non-complex forming, low freezing solvent such as methyl or ethyl chloride or other halide of three to four carbon atoms per molecule or carbon disulfide or other non-complex-forming solvent which is liquid at temperatures below −30° C. The heat of reaction is removed in any convenient manner by internal or external refrigeration with liquid ethylene or other refrigerant.

The polymer forms as a discrete slurry of polymer particles in diluent and leaves the reactor through line 2 through which it passes to flash drum 3 which contains an emulsified mixture of water and a solvent for the polymer immiscible with the water. The water is supplied through line 4 and the solvent through line 5. The water and solvent are kept thoroughly agitated by means of agitator 6. A sufficient amount of water must be present to maintain the water as the continuous phase suitably 1 to 3 parts solvent per part of water. The flash drum 3 is maintained at a temperature sufficiently high to vaporize the methyl chloride, isobutylene and isoprene and at a pressure between about 2 to 50 p.s.i.a. below the pressure in reactor 1. The temperature in the flash drum thus is between about 0.° and 250° F., preferably between about 100 and 160° F. and at pressures between about atmospheric and 180 p.s.i.g. depending upon the particular alkyl halide used. The temperature and pressure in the flash drum are regulated to flash off a sufficient amount of the alkyl halide by line 21 to cause the polymer to dissolve at an accelerated rate in the solvent.

Suitable solvents for emulsifying with the water include any liquid in which the polymer is soluble and which is not miscible with water and which boils above the alkyl halide, such as for example, hexane, heptane, octane, isooctane, the nonanes, the decanes, naphtha fractions, benzene, toluene, Varsol, Solvesso–100 (a substantially 100% aromatic hydrocarbon fraction boiling 315–350° F.) and Solvesso–150 (a substantially 100% aromatic hydrocarbon fraction boiling 365–415° F.), cyclohexane, and cyclohexene, carbon tetrachloride, trichlorethylene, carbon disulfide, methyl ethyl ketone and the like. For simplicity the solvent will be hereinafter referred to as hexane.

Upon agitation with stirrer 6, the polymer goes quickly into solution and the resulting hexane-polymer solution immediately forms as the discontinuous phase of the emulsion. Emulsifiers forming quick-breaking emulsions may be added, if desired.

The unstable emulsion thus formed may be withdrawn through line 7 into gravity separator 8 where the hydrocarbon and water phases quickly separate. The polymer-hexane solution forms as a top layer and is drawn off through line 9 to storage. The water forms as a lower layer and is drawn off through line 10 and recycled to the flash drum.

Instead of passing the unstable emulsion formed in the flash drum to a quiescent zone for separating the phases, it may alternatively be withdrawn through line 11 and mixed with any desired emulsifiers introduced through line 12. The mixture of hexane, water and emulsifiers is then introduced into homogenizer 13 where the particle size of the hydrocarbon or discontinuous phase is reduced. The homogenizer 13 may be a dispersator, a sonic mixer, a colloid mill, a Waring Blendor or the like, or a combination of any of these and may be in one or a plurality of units. The emulsifiers should preferably be those suitable for forming stable latices as described above. From homogenizer 13 the now finely divided dispersion is passed by line 14 to stripper 15 where the hydrocarbon solvent is removed in any suitable manner as by contact with steam or other hot gases. If desired, the water content may be simultaneously reduced to give a final concentrated latex. Hexane and any water are removed overhead through line 16 and condensed in vessel 17 where it is stored and recycled as desired to line 5 through line 18. Finished latex is removed through line 19 and passed to storage drum 20.

The invention will be more fully understood by applying the following illustrative example to the discussion and disclosure herein set forth.

EXAMPLE I

A slurry of a copolymer of 97.5 wt. percent of isobutylene and 2.5 wt. percent of isoprene was prepared at a temperature of −100° C. in the presence of methyl chloride as diluent and aluminum chloride dissolved in methyl chloride as catalyst. The resulting cold slurry was poured into a rapidly stirred mixture of equal parts of water and hexane heated to a temperature of 70° C. The polymer particles in the slurry immediately went into solution in the hexane which in turn was dispersed in the water phase. No agglomeration of the polymer or ice formation was observed.

From the above description and example it is evident that a method has been described which overcomes many of the disadvantages of prior methods of handling the slurry of polymer particles from the reaction zone. If polymer latices are desired then the problem of molecular weight breakdown is avoided since the highest molecular weight polymer produced in the reactor can easily be formed into a latex by the method of this invention. Furthermore, the difficulties of high viscosity encountered when polymer is dissolved in hexane are also overcome. The emulsion of hexane in water has a viscosity only slightly higher than that of water and can easily be pumped or otherwise handled. This allows the amount of polymer which can be dissolved in the hexane to be greatly increased without prohibitively increasing the viscosity. In addition the invention allows great flexibility in the use of the polymer from the reactor slurry. It can be easily and simply processed to form a latex or a solution in hexane. The solution in hexane can then be processed to form coarse polymer slurries in water by dumping into agitated hot water containing a dispersing agent such as zinc stearate as described in Serial No. 625,640 filed December 3, 1956 in the name of Bruce R. Tegge.

The nature of the present invention having been thus fully set forth and specific examples of the same given, what is claimed as new and useful and desired to be secured by Letters Patent is:

1. The process for obtaining a dispersion of a rubbery polymer from the slurry formed by polymerizing iso-olefins having 4 to 7 carbon atoms at a temperature between —40° C. and —160° C., in contact with a Friedel-Crafts catalyst dissolved in a $C_1$ to $C_4$ alkyl halide solvent which is liquid at the reaction temperature to form a polymer slurry, which comprises discharging said polymer slurry directly into a heated, agitated mixture of water and a solvent for the polymer selected from the group consisting of hexane, heptane, octane, iso-octane, the nonanes, the decanes, benzene, toluene, aromatic hydrocarbon fractions boiling 315°–415° F., cyclohexane and cyclohexene, carbon tetrachloride, trichloroethylene, carbon disulfide and methyl ethyl ketone and with the water being in the continuous phase in order to flash off the volatile reaction liquid and dissolve the polymer in the solvent.

2. A process for obtaining a dispersion of a rubbery polymer from the slurry formed by polymerizing 60 to 99.5 weight percent of an isoolefin having 4 to 7 carbon atoms and 40 to 0.5 weight percent of a multiolefin having 4 to 12 carbon atoms and an alkyl halide which has less than 5 carbon atoms and is liquid at the reaction temperature, cooling the mixture to a temperature within the range between —40° C. and —160° C., and contacting said cold mixture with a solution of a Friedel-Crafts catalyst in a non-complex forming organic solvent which is liquid when contacted with said mixture, to form a slurry of polymer particles in cold reaction liquid, which comprises charging said slurry directly into heated, well-agitated mixture of a solvent for the polymer selected from the group consisting of hexane, heptane, octane, iso-octane, the nonanes, the decanes, benzene, toluene, aromatic hydrocarbon fractions boiling 315°–415° F., cyclohexane and cyclohexene, carbon tetrachloride, trichloroethylene, carbon disulfide, and methyl ethyl ketone, and water, with the water being in the continuous phase, in order to flash off the volatile reaction liquid and form a solution of the polymer in the solvent as dispersed phase in the water.

3. The process for obtaining a dispersion of a rubbery polymer from the slurry formed by polymerizing iso-butylene at a temperature between —40° C. and —160° C., in an alkyl halide diluent which has 1 to 4 carbon atoms per molecule and is liquid at the polymerization temperature, in contact with a Friedel-Crafts catalyst dissolved in a $C_1$ to $C_4$ alkyl halide solvent which is liquid at the reaction temperature to form a slurry of solid polymer particles in cold reaction liquid, which comprises discharging said slurry directly into a heated, well-agitated mixture of water and a solvent for the polymer selected from the group consisting of hexane, heptane, octane, iso-octane, the nonanes, the decanes, benzene, toluene, aromatic hydrocarbon fractions boiling 315°–415° F., cyclohexane and cyclohexene, carbon tetrachloride, trichloroethylene, carbon disulfide and methyl ethyl ketone with the water being in the continuous phase in order to flash off the volatile reaction liquid and form a dispersion in water of polymer dissolved in solvent.

4. A process according to claim 3 wherein the diluent is an alkyl halide having less than 3 carbon atoms per molecule.

5. A process according to claim 4 wherein the polymer solvent is hexane.

6. The process for obtaining a dispersion of a rubbery polymer from the slurry formed by copolymerizing about 70 to 99.5% isobutylene and about 30 to 0.5% of a conjugated diolefin hydrocarbon having 4 to 12 carbon atoms per molecule at a temperature between —40° C. and —160° C. with a Friedel-Crafts catalyst dissolved in a $C_1$ to $C_4$ alkyl halide solvent which is liquid at the reaction temperature to form a solid polymer which comprises discharging the polymer directly into a heated, well-agitated mixture of water and a solvent for the polymer selected from the group consisting of hexane, heptane, octane, iso-octane, the nonanes, the decanes, benzene, toluene, aromatic hydrocarbon fractions boiling 315°–415° F., cyclohexane and cyclohexene, carbon tetrachloride, trichloroethylene, carbon disulfide and methyl ethyl ketone with water being in the continuous phase in order to flash off the volatile reaction liquid and form a dispersion in water of polymer dissolved in solvent.

7. The process for recovering a rubbery polymer from the slurry formed by copolymerizing one part of a mixture consisting of 60 to 99.5 weight percent of isobutylene and 40 to 0.5 weight percent of a conjugated diolefin hydrocarbon having 4 to 6 carbon atoms per molecule in up to 10 parts of a suitable diluent which has 1 to 4 carbon atoms per molecule and is liquid at the reaction temperature by adding thereto a solution of an aluminum halide catalyst in a $C_1$ to $C_4$ alkyl halide solvent, which solution is liquid at the reaction temperature, to form a slurry of solid polymer particles in reaction liquid at a temperature between —40° C. and —160° C., which comprises withdrawing the slurry from the reaction zone and discharging it into a heated, well-agitated mixture of water and a solvent for the polymer selected from the group consisting of hexane, heptane, octane, iso-octane, the nonanes, the decanes, benzene, toluene, aromatic hydrocarbon fractions boiling 315°–415° F., cyclohexane and cyclohexene, carbon tetrachloride, trichloroethylene, carbon disulfide and methyl ethyl ketone with the water being in the continuous phase in order to flash off the volatile reaction liquids and to form a dispersion in water of polymer dissolved in solvent.

8. The process for obtaining a dispersion of a rubbery polymer from the slurry formed by polymerizing one part of a mixture consisting of 60 to 99.5 weight percent of isobutylene and 40 to 0.5 weight percent of isoprene in up to 10 parts of a suitable diluent which has 1 to 4 carbon atoms per molecule and is liquid at the reaction temperature, by adding thereto a solution of Friedel-Crafts catalyst in a $C_1$ to $C_4$ alkyl halide solvent, which solution is liquid at the reaction temperature, to form a slurry of solid polymer particles in reaction liquid at a temperature between −40° C. and −160° C., which comprises withdrawing the slurry from the reaction zone, discharging it directly into a heated, well-agitated mixture of water and a solvent for the polymer selected from the group consisting of hexane, heptane, octane, iso-octane, the nonanes, the decanes, benzene, toluene, aromatic hydrocarbon fractions boiling 315°–415° F., cyclohexane and cyclohexene, carbon tetrachloride, trichloroethylene, carbon disulfide and methyl ethyl ketone with the water being in the continuous phase in order to flash off the volatile reaction liquids to form a dispersion in water of polymer dissolved in solvent, and subsequently removing the solvent to produce a slurry of polymer particles in water.

9. The process for obtaining a dispersion of a rubbery polymer from the slurry formed by polymerizing one part of a mixture consisting of 60 to 99.5 weight percent of isobutylene and 40 to 0.5 weight percent of a conjugated butadiene hydrocarbon having 4 to 6 carbon atoms in up to 10 parts of a diluent which has 1 to 4 carbon atoms per molecule and is liquid at the polymerization temperature, by adding thereto a solution of an aluminum halide catalyst in a $C_1$ to $C_4$ alkyl halide organic solvent which is liquid at the reaction temperature to form a slurry of solid polymer particles in reaction, liquid at a temperature between −40° C. and −160° C., which comprises withdrawing the slurry from the reaction zone, discharging it directly into a heated, well-agitated mixture of an emulsifier, water, and a solvent for the polymer selected from the group consisting of hexane, heptane, octane, iso-octane, the nonanes, the decanes, benzene, toluene, aromatic hydrocarbon fractions boiling 315°–415° F., cyclohexane and cyclohexene, carbon tetrachloride, trichloroethylene, carbon disulfide and methyl ethyl ketone with the water being in the continuous phase in order to flash off the volatile reaction liquids and form a dispersion in water of polymer dissolved in solvent, and subsequently removing the solvent to produce an emulsion of polymer particles in water.

10. The process for obtaining a dispersion of a rubbery polymer from the slurry formed by copolymerizing one part of a mixture consisting of 60 to 99.5 weight percent isobutylene and 40 to 0.5 weight percent of a conjugated diolefin hydrocarbon having 4 to 6 carbon atoms per molecule in up to 10 parts of methyl chloride while maintaining the reaction mixture at a temperature between −40° C. and −160° C., thereby forming a slurry of solid polymer particles in reaction liquid, which comprises withdrawing the slurry from the reaction zone and discharging it directly into a heated, well-agitated mixture of water and hexane with the water being in the continuous phase in order to flash off the volatile reaction liquid and form an unstable dispersion in water of polymer dissolved in hexane, and separating the solution of polymer in hexane from the water.

11. The process for obtaining a dispersion of a rubbery polymer from the slurry formed by copolymerizing one part of a mixture consisting of 60 to 99.5 weight percent isobutylene and 40 to 0.5 weight percent of a conjugated diolefin hydrocarbon having 4 to 6 carbon atoms per molecule in up to 10 parts of methyl chloride while maintaining the reaction mixture at a temperature between −40° C. and −160° C., thereby forming a slurry of solid polymer particles in reaction liquid, which comprises withdrawing the slurry from the reaction zone and discharging it directly into a heated, well-agitated mixture of water and hexane with water being in the continuous phase in order to flash off the volatile reaction liquid and form an unstable dispersion in water of polymer dissolved in hexane, homogenizing the dispersion in the presence of an emulsifying agent, removing the hexane from the dispersion and recycling it to the dispersion forming step, whereby a latex of polymer particles in water is formed.

References Cited in the file of this patent

UNITED STATES PATENTS

| | | |
|---|---|---|
| 2,408,007 | Thomas et al. | Sept. 24, 1946 |
| 2,595,797 | Leyonmark | May 6, 1952 |

FOREIGN PATENTS

| | | |
|---|---|---|
| 363,681 | Great Britain | June 19, 1930 |
| 515,763 | Great Britain | Dec. 13, 1939 |